United States Patent
Azadeh et al.

(10) Patent No.: US 10,066,560 B2
(45) Date of Patent: Sep. 4, 2018

(54) METHOD FOR OPERATING AN INTERNAL COMBUSTION ENGINE AND CORRESPONDING INTERNAL COMBUSTION ENGINE

(71) Applicant: AUDI AG, Ingolstadt (DE)

(72) Inventors: Reza Azadeh, Regensburg (DE); Markus Sonner, Kipfenberg (DE); Knut Weber, Kösching (DE)

(73) Assignee: Audi AG, Ingolstadt (DE)

( * ) Notice: Subject to any disclaimer, the term of this patent is extended or adjusted under 35 U.S.C. 154(b) by 27 days.

(21) Appl. No.: 15/117,082

(22) PCT Filed: Jan. 31, 2015

(86) PCT No.: PCT/EP2015/000186
§ 371 (c)(1),
(2) Date: Aug. 5, 2016

(87) PCT Pub. No.: WO2015/117742
PCT Pub. Date: Aug. 13, 2015

(65) Prior Publication Data
US 2017/0167419 A1    Jun. 15, 2017

(30) Foreign Application Priority Data

Feb. 7, 2014 (DE) .................. 10 2014 001 672

(51) Int. Cl.
*F01N 3/00*    (2006.01)
*F02D 41/02*    (2006.01)
(Continued)

(52) U.S. Cl.
CPC ..... *F02D 41/0295* (2013.01); *F02D 13/0261* (2013.01); *F02D 41/0007* (2013.01);
(Continued)

(58) Field of Classification Search
USPC ....... 60/274, 280, 284, 285, 286; 123/90.15, 123/90.16
See application file for complete search history.

(56) References Cited

U.S. PATENT DOCUMENTS

| 5,558,051 A | 9/1996 | Yoshioka |
| 7,155,899 B2 * | 1/2007 | Beer .................. F01N 3/2006 |
| | | 123/90.15 |

(Continued)

FOREIGN PATENT DOCUMENTS

| AT | 501 678 | 10/2006 |
| CN | 1363012 A | 8/2002 |

(Continued)

OTHER PUBLICATIONS

International Search Report issued by the European Patent Office in International Application PCT/EP2015/000186.

(Continued)

*Primary Examiner* — Binh Q Tran
(74) *Attorney, Agent, or Firm* — Henry M. Feiereisen LLC

(57) ABSTRACT

The invention relates to a method for operating an internal combustion engine comprising at least one turbocharger, at least one catalytic converter and a variable valve train, a valve overlap parameter being determined in at least one operating mode of the internal combustion engine and being used to set the valve train. According to the invention, the valve overlap parameter is adapted on the basis of at least one parameter for the condition of the catalytic converter and/or at least one parameter for the condition of the turbocharger, prior to being used to set the valve train. The invention also relates to an internal combustion engine.

10 Claims, 1 Drawing Sheet

(51) Int. Cl.
*F02D 13/02* (2006.01)
*F02D 41/00* (2006.01)
*F02D 41/30* (2006.01)

(52) U.S. Cl.
CPC ........ *F02D 41/30* (2013.01); *F02D 2041/001* (2013.01); *F02D 2200/0802* (2013.01); *F02D 2200/0814* (2013.01); *F02D 2200/0816* (2013.01); *Y02T 10/144* (2013.01); *Y02T 10/18* (2013.01)

(56) References Cited

U.S. PATENT DOCUMENTS

| | | | |
|---|---|---|---|
| 8,464,514 B2 * | 6/2013 | Kerns | F02D 41/0007 60/274 |
| 8,495,865 B2 * | 7/2013 | Okada | F02D 13/0257 123/90.15 |
| 9,506,397 B2 * | 11/2016 | Karnik | F02B 37/18 |
| 9,695,755 B2 * | 7/2017 | Glugla | F02B 37/168 |
| 2006/0112680 A1 | 6/2006 | Beer et al. | |
| 2009/0013339 A1 | 1/2009 | Oota | |
| 2009/0151323 A1 | 6/2009 | Severin et al. | |
| 2013/0255631 A1 | 10/2013 | Ruhland et al. | |
| 2013/0305707 A1 | 11/2013 | Takagi | |
| 2013/0311068 A1 | 11/2013 | Rollinger | |

FOREIGN PATENT DOCUMENTS

| | | |
|---|---|---|
| CN | 101171411 A | 4/2008 |
| CN | 101573517 A | 11/2009 |
| DE | 102 59 052 | 4/2004 |
| DE | 103 03 705 | 8/2004 |
| DE | 10 2004 001 724 | 8/2005 |
| DE | 10 2006 025 050 | 11/2007 |
| DE | 10 2011 005 516 | 9/2012 |
| DE | 10 2012 204 885 | 3/2013 |
| DE | 102013209027 A1 | 11/2013 |
| EP | 1 298 292 | 4/2003 |
| EP | 2 674 602 | 12/2013 |
| GB | 2 367 859 | 4/2002 |
| JP | 2009019611 A | 1/2009 |
| WO | WO 2004/055347 | 7/2004 |
| WO | WO 2007/079510 A2 | 7/2007 |

OTHER PUBLICATIONS

Chinese Search Report dated Apr. 25, 2018 with respect to counterpart Chinese patent application 2015800073880.

English Translation of Chinese Search Report dated Apr. 25, 2018 with respect to counterpart Chinese patent application 2015800073880.

* cited by examiner

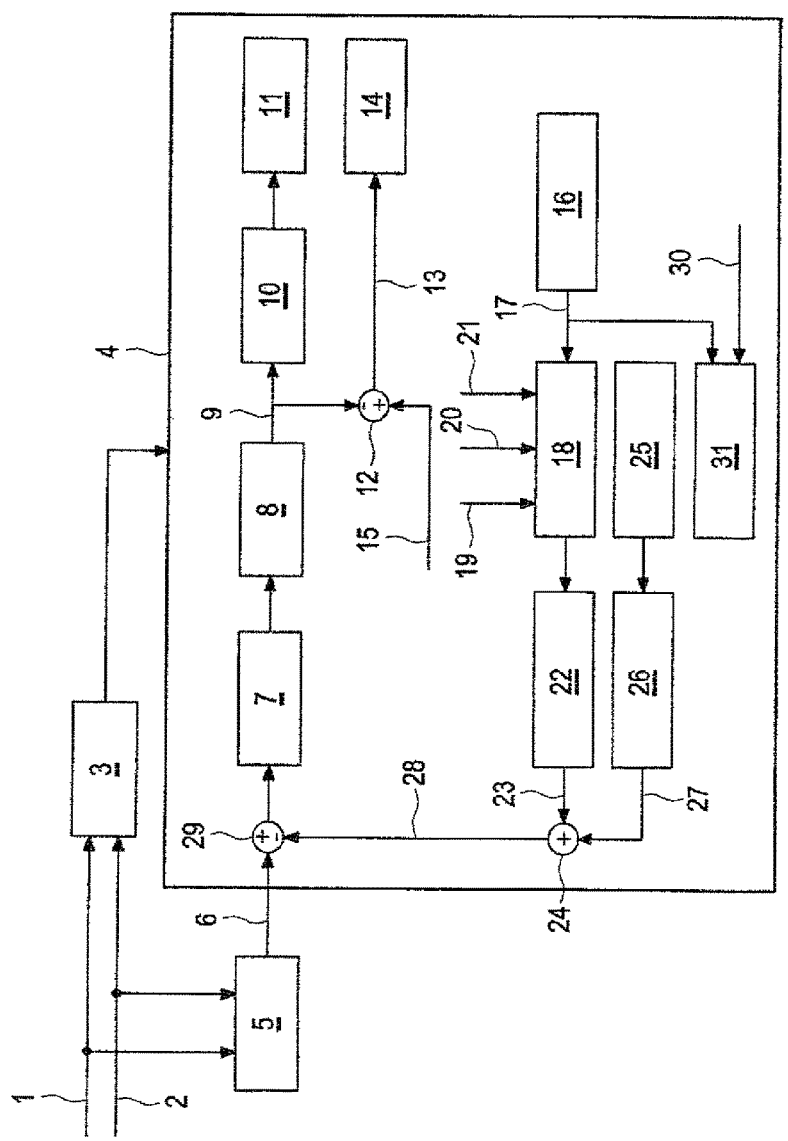

METHOD FOR OPERATING AN INTERNAL COMBUSTION ENGINE AND CORRESPONDING INTERNAL COMBUSTION ENGINE

CROSS-REFERENCES TO RELATED APPLICATIONS

This application is the U.S. National Stage of International Application No. PCT/EP2015/000186, filed Jan. 31, 2015, which designated the United States and has been published as International Publication No. WO 2015/117742 and which claims the priority of German Patent Application, Serial No. 10 2014 001 672.2, filed Feb. 7, 2014, pursuant to 35 U.S.C. 119(a)-(d).

BACKGROUND OF THE INVENTION

The invention relates to a method for operating an internal combustion engine. The invention further relates to an internal combustion engine.

The internal combustion engine is used, for example, to drive a motor vehicle, thus providing a torque directed to a drive of the motor vehicle. The internal combustion engine is charged and has the exhaust gas turbocharger for this purpose. The exhaust gas turbocharger has a turbine and a compressor operatively connected to the turbine. The exhaust gas generated by the internal combustion engine during operation is supplied to the turbine, with the turbine converting the enthalpy contained in the exhaust gas and/or the flow energy (especially rotational movement) into kinetic energy. The kinetic energy is used to drive the compressor.

The compressor is used to condense air taken in, in particular fresh air, i.e. to bring it to a higher pressure level. The compressed air is then supplied to the internal combustion engine where it contributes to the performance of the combustion. By increasing the pressure level prior to supplying the air into the internal combustion engine, the amount of air available during combustion can be increased so that the power of the internal combustion engine can be significantly increased.

Furthermore, the internal combustion engine has the at least one catalyst, which is used to clean the exhaust gases generated by the internal combustion engine. The exhaust gases are thus passed through the catalyst and only then discharged into the surroundings of the internal combustion engine. Preferably, the catalyst is arranged downstream of the exhaust gas turbocharger so that the exhaust gas of the internal combustion engine first flows through the exhaust gas turbocharger and only then the catalyst.

Finally, the internal combustion engine has the variable valve train which enables the influence of valve timing of at least one intake valve and/or an exhaust valve of the internal combustion engine. Preferably, the internal combustion engine has a plurality of cylinders, wherein each of the cylinders are assigned at least one intake valve and one exhaust valve. The intake valve and the exhaust valve or rather all intake valves and all exhaust valves of the internal combustion engine are associated with the valve train. The variable design of the valve train now makes it possible to specifically influence or set the valve timing of the intake valves, exhaust valves or rather both intake valves and exhaust valves.

It is provided in the at least one operating mode that the variable valve train is set such that a valve overlap exists. By this, it is understood that the at least one intake valve and the at least one exhaust valve of this cylinder are simultaneously opened during the exchange of gases in the cylinder. Air streaming in through the intake valve in the cylinder can thus immediately flow out again through the exhaust valve. If there is a positive pressure difference between the intake side of flow before the intake valve and the exhaust side of flow after the exhaust valve, then the cylinder is flushed with air, in particular fresh air, wherein a part of the air takes along the hot exhaust gas found in the cylinder to the exhaust side, in particular in an exhaust manifold of the internal combustion engine.

The filling is significantly increased by such a measure compared to a conventional operation in which there is no valve overlap. Because an increased mass flow on the exhaust side is simultaneously present, the response behavior of the exhaust gas turbocharger is improved, particularly at low rotational speeds of the internal combustion engine. In addition, the amount of exhaust gas remaining in the cylinder, which is also referred to as a residual gas proportion, is reduced, causing a reduction of the combustion chamber temperature. This leads to a reduced tendency to knock, particularly at full load of the internal combustion engine. The valve overlap is determined by the valve overlap parameters. Thus, the greater the valve overlap parameter selected, the greater the valve overlap. In contrast, there is no valve overlap for a valve overlap parameter of zero. The valve overlap parameter is now determined in the at least one operating mode and set on the valve train so that the internal combustion engine is operated with the appropriate valve overlap.

A disadvantage of the valve overlap, however, is that the increased amount of air, which corresponds to a larger amount of oxygen, can lead to saturation of the oxygen storage capability of the catalyst and thus to a drop in the NOx conversion performance. Accordingly, there is a conflict between the advantages described above and the disadvantage that the emission limit values, particularly for NOx, may be impaired.

One possible remedy is that the internal combustion engine is operated with a richer fuel-air mixture. This leads, through after-burning, to an improvement or rather a reduction of emissions, however, simultaneously causing a higher thermal loading of the catalyst. In addition, the carbon dioxide emissions is increased by the increased use of fuel. Particulate emissions may also worsen.

For example, the publications DE 10 2012 204 885 B3 and GB 2 367 859 A are known from the prior art. The former describes a method for operating an internal combustion engine with at least one cylinder which has an exhaust gas discharge system for discharging the exhaust gases and at least one exhaust gas after-treatment system arranged in this exhaust gas discharge system. A first lambda sensor for detecting a first air ratio is arranged upstream of the at least one exhaust after-treatment system and a second lambda sensor for detecting a second air ratio is arranged downstream of the at least one exhaust gas treatment system. Depending on an operation of the internal combustion engine, either the first lambda sensor or the second lambda sensor should now be used by means of engine control for the control of the air ratio, wherein at least one engine characteristic map stored in the engine management system using at least two operating parameters of the internal combustion engine specifies which lambda sensor is to be used for control of the air ratio as input variables.

Publication DE 103 03 705 A1 is further known from the prior art. This describes a method for operating an internal combustion engine (which has a variable valve train) working with direct fuel injection and provided with a charging device. The valve overlap of the gas exchange valves is thereby set for a full load operation or at least near full load operation of the internal combustion engine by adjusting the gas exchange valve timing on stationary set points. This performs a dynamic correction of the stationary set points toward higher valve overlap values after gas exchange cycle TDC with an elevated load requirement in the charged operation. The dynamic correction values are weighted by means of a first factor which is a function of the pressure difference between the pressure set point and the actual pressure in the intake passage and is weighted by means of a second factor which takes into account the temperature of the exhaust gas catalyst.

In addition, the publication AT 501 678 A2 describes a method for operating an external ignition internal combustion engine with direct fuel injection, which has at least one exhaust gas turbocharger and at least one exhaust gas treatment device, with at least one device for altering the intake and/or exhaust timing, wherein the internal combustion engine, in particular at low rotational speed, is operated with a defined valve overlap of intake and exhaust valves for flushing the combustion chamber, and wherein the valve overlap is changed as a function of at least one engine operating parameter. In order to improve the torque of the internal combustion engine, particularly at low engine rotational speed, it is provided that the flushing is limited or reduced after reaching a threshold value of the engine operating parameter.

Finally, publication DE 10 2006 025 050 B4 shows a method and device for operating an exhaust gas aftertreatment system and the publication DE 10 2011 005 516 A1 shows a method and a device for detecting at least one characteristic of a gas.

SUMMARY OF THE INVENTION

It is an object of the invention to propose a method for operating an internal combustion engine, which has advantages compared to known methods, in particular enabling efficient operation of the internal combustion engine in a variety of operational areas.

The object is achieved in accordance with the invention by a method of operating an internal combustion engine with at least one exhaust gas turbocharger, at least one catalyst, and a variable valve train, wherein in at least one operating mode of the internal combustion engine, a valve overlap parameter is determined and set on the valve train, wherein the valve overlap parameter is adjusted prior to the setting on the valve train, based on at least one catalyst state parameter and/or at least one exhaust gas turbocharger state parameter, wherein an oxygen fill level of the catalyst and a total operation time of the catalyst are used as a catalyst state parameter and an exhaust gas turbocharger rotational speed is used as an exhaust gas turbocharger state parameter.

In accordance with the invention the oxygen fill level of the catalyst and total operating time of the catalyst are used as a catalyst state parameter and the exhaust gas turbocharger rotation speed is used as an exhaust gas turbocharger state parameter. The valve overlap parameter is adjusted prior to tuning the valve train on the basis of at least one catalyst state parameter and/or at least one exhaust gas turbocharger state parameter. Usually, the once-determined valve overlap parameter is set directly on the valve train. The determination is made, for example, based on at least one operating parameter of the internal combustion engine, in particular of the operating point of the internal combustion engine. The operating point is in particular characterized by the rotational speed and the generated torque of the internal combustion engine.

The valve overlap parameter in particular is thereby determined statically. This means that it is determined once for a plurality of values for the at least one operating parameter, for example, on a reference internal combustion engine, and is subsequently stored in the internal combustion engine, in particular a control unit of the internal combustion engine. Thus, the valve overlap parameter or rather its value over the entire service life of the internal combustion engine is constant for the same value of the operating parameter. It is designed such that it preferably guarantees compliance with the emission limits over entire the service life of the internal combustion engine.

However, this means that the valve overlap can only be selected as a comparatively small value, so that the potential of the variable valve train can not be fully exploited. Also, the internal combustion engine can not be easily used for different types of vehicles, especially for vehicles of different weight classes. Because of this, for example, the valve overlap must be selected differently as a function of the operating point of the internal combustion engine to comply with the emission limits.

For this reason, the subsequent adjustment of the valve overlap parameter is now provided, wherein this adjustment is realized on the basis of the catalyst state parameter or the exhaust gas turbocharger state parameter. An adjustment based on both parameters may also be provided. Thus, on the one hand, the valve overlap parameter is preferably present as a function of the operating point of the internal combustion engine and, on the other hand, the catalyst state parameter and/or the exhaust gas turbocharger state parameter. The valve overlap parameter which characterizes the valve overlap to be set is only set after adjustment.

A further embodiment of the invention provides that a scavenging mode is used as an operating mode, for which the rotational speed of the internal combustion engine is based on a maximum rotational speed of at most 50%, at most 40%, at most 30%, at most 20% or at most 10% and/or torque is based on a maximum torque at of least 25%, at least 50%, at least 60%, at least 70%, at least 80% or at least 90%. In supercharged internal combustion engines, especially supercharged Otto internal combustion engines, there is a desire to quickly achieve a high corner moment at low speed. To meet this requirement, the internal combustion engine is operated in the scavenging mode, in which a comparatively large valve overlap is set in the corner moment range, which is characterized by simultaneous high load and low rotation. The advantages already described above can be obtained in this manner.

In particular, a large torque can be obtained even at a low rotational speed of the internal combustion engine. For example, the ratio of adjusted or rather current rotational speed of the internal combustion engine based on the maximum rotational speed, thus the highest rotational speed provided in normal operation of the internal combustion engine, is at most 50%, at most 40%, at most 30%, at most 20% or at most 10%. Simultaneously or alternatively, it may be provided that the ratio of adjusted or rather current torque and the maximum torque, thus the maximum torque achievable by means of the internal combustion engine, is at least 25%, at least 50%, at least 60%, at least 70%, at least 80% or at least 90%.

A further development of the invention provides that an oxygen fill level of the catalyst, a catalyst temperature, a catalyst volume and/or a total operation time of the catalyst is used as catalyst state parameter, and/or that an exhaust gas turbocharger rotational speed is used as an exhaust gas turbocharger state parameter. The catalyst has an intermediate storage for intermediate storage of oxygen. In that regard, it is preferably designed as a storage catalyst. The oxygen fill level describes the instantaneous filling of the catalyst or rather of the intermediate storage with oxygen, preferably relative to a maximum achievable fill level. The catalyst temperature describes either the temperature of the catalyst itself or a temperature of the exhaust gas flowing through the catalyst. The catalyst volume is the flow-effective volume through which the exhaust gas of the internal combustion engine flows.

The total operating time of the catalyst characterizes the age of the catalyst. With increasing total operating time, the ability of the catalyst to free the exhaust gas of pollutants within it usually worsens, as does the ability of the intermediate storage to intermediately store the oxygen. However, since performing the scavenging mode with simultaneous emissions compliance presupposes an available capacity of the intermediate storage, the possible valve overlap is also at least indirectly dependent on the total operating time of the catalyst. The turbocharger rotational speed can be used as a turbocharger state parameter. In particular, a conclusion may be drawn that a sufficiently high rotational speed of the exhaust gas turbo loader is already present. The so-called "turbo lag" is thus overcome. If this is the case, a sufficiently high torque can also be achieved with a smaller valve overlap. The valve overlap can be accordingly reduced in this case.

A preferred embodiment of the invention provides that the valve overlap parameter is determined by means of a mathematical relationship, a table and/or an engine characteristic map. Basically, the valve overlap parameter can be determined in any way. However, the procedures listed above are preferably used. Especially preferred is determination that uses the engine characteristic map. For example, the valve overlap parameter, a function of the rotational speed and/or the torque of the engine, preferably of the operating point of the internal combustion engine, is stored in engine characteristic map. This means that for determining the valve overlap parameter, the operating point is used as an input parameter for the engine characteristic map, while the valve overlap parameter results as an output parameter of the engine characteristic map. It is therefore of importance that the mathematical relationship, the table and the engine characteristic map are static, and thus does not change over the service life of the internal combustion engine. This means that the same rotational speed and/or the same torque is always associated with the same valve overlap parameters.

Furthermore, it can be provided in a preferred embodiment of the invention that the oxygen fill level is determined by means of a model based on a lambda value and/or an exhaust gas mass flow and the valve overlap is reduced during adjustment of the valve overlap parameter, when the oxygen fill level exceeds a preset fill level. The oxygen fill level of the catalyst or rather of the intermediate storage can be determined, for example, by integration over time. For this purpose, in particular the relationship $$m_{O2} = 23\% * \int_{t_2}^{t_2} \left(1 - \frac{1}{\lambda}\right) * m_L * dt$$

is used. The relationship provides the oxygen mass contained in the intermediate storage as an output parameter. These can then be set, for example, with respect to the maximum fill level. Naturally, however, the absolute value for the oxygen fill level can be used. If the oxygen fill level exceeds a preset fill level, then the determined valve overlap parameters can not be used. In fact, it is necessary to adjust it so that the valve overlap is reduced in order to at least delay a further loading of the catalyst with oxygen. The preset fill level is, for example, based on the maximum fill level, at least 50%, at least 60%, at least 70%, at least 80% or at least 90%.

A preferred embodiment of the invention provides that the reduction of the valve overlap is determined from the difference between the oxygen fill level and the preset fill level. The difference is especially determined once the oxygen fill level has exceeded the preset fill level. Preferably, it is now provided that the more the valve overlap is reduced, the greater the difference between the oxygen fill level and the preset fill level. For example, a smaller reduction of the valve overlap may be provided for a smaller difference than for a greater difference. Preferably, the reduction of the valve overlap is determined depending on the difference, in particular, proportional to the difference.

A further embodiment of the invention provides that the preset fill level is determined from the catalyst temperature, the catalyst volume and/or the total operating time of the catalyst. Based on at least one of the above parameters, especially all parameters named above, for example, the maximum fill level can be determined, from which subsequently the preset fill level is determined, in particular by using a constant factor. Of course, it is also possible, to directly determine the preset fill level from one or more of the listed parameters, in particular from all the above-mentioned parameters.

A preferred embodiment of the invention provides that the valve overlap is reduced during adjustment of the valve overlap parameter, when the exhaust gas turbocharger rotational speed is greater than or equal to a preset rotational speed. As already explained above, the valve overlap can be selected as smaller if it is ensured that the exhaust gas turbocharger is no longer located in the so-called "turbo lag". Its rotational speed is already great enough. The preset rotational speed is used as a threshold for this purpose. This is, for example, determined from the operating point of the internal combustion engine, the rotational speed and the torque. Alternatively, the target rotational speed can be defined as a proportion of the maximum rotational speed of the exhaust gas turbocharger, i.e., a maximum attainable rotational speed of the same. For example, the preset rotational speed is at least 10%, at least 20%, at least 30%, at least 40% or at least 50% of this maximum rotational speed.

Finally, it may be provided that a fuel injection amount is determined from an amount of air introduced into a cylinder, wherein the fuel injection amount is adjusted when the oxygen fill level exceeds the preset fill level, and/or when the catalyst temperature exceeds a preset temperature. Both air and fuel must be introduced into the cylinder to operate the internal combustion engine. The introduction of air is performed by suitably adjusting the valve train, for example, in the scavenging mode. The amount of air is, for example, being calculated by means of a model and/or being measured using at least one sensor, is thus well known, at least within a certain accuracy. Now the fuel injection quantity is determined on the basis of the air quantity, wherein particularly a combustion air ratio is taken into account. For example, the combustion air ratio is equal to one in the case of a stoichiometric combustion.

The fuel injection amount is determined from the amount of air by means of a mathematical relationship, a table and/or a engine characteristic map. Of course, in principle, however, any method of determination may be used. The determination of the fuel injection quantity is initially static, as well the determination of the valve overlap parameter. For this reason, an adjustment is also made here when at least a certain condition is applicable. Preferably, there is a checking of the oxygen fill level when the preset fill level is exceeded and/or a checking of the catalyst temperature when the preset temperature is exceeded. Preferably, the fuel injection amount is adjusted upwards, i.e., at least one of the conditions increases when applicable. Through this increasing, the excess air contained in the exhaust of the internal combustion engine is reduced, so that the oxygen fill level of the catalyst increases more slowly or is preferably kept constant or rather even reduced. In addition, the temperature of the exhaust gas is reduced by the additional fuel, so that the increase in the catalyst temperature is slowed or, preferably, prevented. A reduction in the catalyst temperature can also be achieved in this manner.

The invention further relates to an internal combustion engine, particularly for performing the method according to the preceding embodiments, with at least one exhaust gas turbocharger, at least one catalyst, and a variable valve train, wherein it is provided to determine a valve overlap parameter in at least one operating mode of the internal combustion engine and to set on the valve train, wherein the internal combustion engine is designed to adjust the valve overlap parameter prior to setting of the valve train on the basis of at least one catalyst state parameter and/or at least one exhaust gas turbocharger state parameter. It is thereby provided that an oxygen fill level of the catalyst and a total operating time of the catalyst are used as a catalyst state parameter as well as an exhaust gas turbocharger rotational speed is used as an exhaust gas turbocharger state parameter. The advantages of such a configuration of the internal combustion engine or rather such a procedure have already been discussed. The internal combustion engine and the method can be further developed in accordance with the embodiments above, insofar as reference is made to this.

BRIEF DESCRIPTION OF THE DRAWING

The invention is explained in greater detail based on the exemplary embodiments illustrated in the drawings, without limiting the invention. The sole FIG. 1 shows a schematic representation of a method for operating an internal combustion engine.

DETAILED DESCRIPTION OF PREFERRED EMBODIMENTS

A method for operating an internal combustion engine is shown as an example in the FIGURE. The internal combustion engine has an exhaust gas turbocharger, a catalyst and a variable valve train. The variable valve train is used to change valve timing of the intake valves and/or exhaust valves, preferably of both, of the internal combustion engine. In particular, a valve overlap can be set by means of the valve train. By this, a period of time is understood during which both the intake valve and the exhaust valve of a cylinder of the internal combustion engine are simultaneously opened. The method is implemented, for example, by means of a control device of the internal combustion engine.

A load or rather a torque of the internal combustion engine is provided along arrow 1 as an input variable and the rotational speed of the internal combustion engine is provided along arrow 2. The load or rather the torque and rotational speed together define the operating point of the internal combustion engine. It is determined whether a normal mode or a scavenging mode is to be performed as part of evaluation 3. In the former, the valve overlap is smaller than in scavenging mode or even equal to zero. Conversely, the valve overlap in the scavenging mode is correspondingly greater than in the normal mode, in particular greater than zero.

If the scavenging mode is to be implemented, the partial method indicated in box 4 is performed. First, a valve overlap parameter (which is output along arrow 6) is determined from a engine characteristic map 5, which has the torque and the rotational speed as input variables. In the normal mode, this valve overlap parameter is set directly on the internal combustion engine or rather the variable valve train. In the scavenging mode, an effective overlap is now calculated in an evaluation 7, from which in turn as part of an evaluation 8, an air mass flushed through by a cylinder of the internal combustion engine is determined. This air mass is output along arrow 9.

As part of an evaluation 10, a flush rate is determined from the air mass, which is used as part of an evaluation 11 in a calculation of a lambda set point. In addition, the air mass determined as part of the evaluation 8 forms an input parameter of a subtractor 12 whose output variable is output along arrow 13 and is then used to determine a fuel injection quantity as part of an evaluation 14. Another input variable of the subtractor 12 represents an amount of air introduced into the cylinder, which is supplied to the subtractor 12 along arrow 15. In the subtractor 12, the purged air mass is subtracted from the calculated air mass 15 and the result supplied to the evaluation 14.

The inventive method is characterized in that the valve overlap parameter is adjusted before the setting on the valve train, based on at least one catalyst state parameter and/or at least one exhaust gas turbocharger state parameter. For this purpose, an oxygen fill level of the catalyst is first determined as part of an evaluation 16, and provided along arrow 17. The oxygen fill level thereby represents a catalyst state parameter. Further catalyst state parameters of an evaluation 18 are supplied along the arrows 19, 20 and 21, namely, in this order: a catalyst temperature, catalyst volume, and a total operating time of the catalyst. A preset fill level is determined from the input variables supplied along the arrows 17, 19, 20 and 21 as part of the evaluation 18 and compared with the oxygen fill level. For example, a difference between the oxygen fill level and the preset fill level is thereby determined. This difference can be subsequently used in an evaluation 22 for determining a first correction value. This first correction value is supplied along arrow 23 to an adder.

As part of an evaluation 25, the exhaust gas turbocharger rotational speed, which is used as an exhaust gas turbocharger state parameter, can be compared with a preset rotational speed. If the exhaust gas turbocharger rotational speed is greater than or equal to the preset rotational speed, a second correction value is determined as part of evaluation 26 and also supplied to the adder 24 along arrow 27. In particular, the second correction value is selected such that the valve overlap is reduced when the exhaust gas turbocharger rotational speed is greater than or equal to the preset rotational speed. The two correction values are added by the adder 24 and the result supplied to a subtractor 29 along arrow 28, which has the valve overlap parameter as a further input variable along arrow 6. The result of the adder 24 is now used to adjust the valve overlap parameter, in particular, it is subtracted from the valve overlap parameters. The result is then supplied to the evaluation 7 and/or set on the variable valve train.

Furthermore, it can be provided that the catalyst temperature is supplied to an evaluation 31 along arrow 30, which in addition, has the oxygen fill level of the catalyst as an input variable. If it is detected that the oxygen fill level exceeds the preset fill level and/or the catalyst temperature exceeds a preset temperature, the previously determined fuel injection quantity can be adjusted as part of the evaluation 14 on this basis. With the above-described method for operating the internal combustion engine, it is possible to provide a very high torque by means of the internal combustion engine even at low rotational speeds, wherein exhaust emission limits can be met readily at the same time.

What is claimed is:

1. A method for operating an internal combustion engine comprising an exhaust turbocharger, a catalytic converter and a variable valve train, the method comprising the steps of:
   determining a valve overlap parameter in an operating mode of the internal combustion engine;
   adjusting the valve overlap parameter on the basis of one selected from the group of catalyst state parameters consisting of an oxygen fill level of the catalyst and a total operation time of the catalyst; and
   adjusting the valve overlap parameter to the valve train.

2. The method according to claim 1, wherein a scavenging mode is used as the operating mode, for which the rotational speed of the internal combustion engine is at most 50%, at most 40%, at most 30%, at most 20% or at most 10% of a maximum rotational speed, and the torque is at least 25%, at least 50%, at least 60%, at least 70%, at least 80% or at least 90% of a maximum torque.

3. The method according to claim 1, wherein the group of catalyst state parameters further consists of a catalyst temperature and a catalyst volume.

4. The method according to claim 1, further adjusting the valve overlap parameter on the basis of an exhaust gas turbocharger rotational speed.

5. The method according to claim 1, further determining the oxygen fill level on the basis of a model based on a lambda value and an exhaust mass flow rate, and reducing the valve overlap during adjustment of the valve overlap parameter when the oxygen fill level exceeds a preset fill level.

6. The method according claim 1, further determining the reduction of the valve overlap from the difference between the oxygen fill level and a preset fill level.

7. The method according to claim 5, further determining the preset fill level from a catalyst temperature, a catalyst volume and a total operating time of the catalyst.

8. The method according to claim 1, wherein when adjusting the valve overlap parameter, reducing the valve overlap parameter when the exhaust gas turbocharger rotational speed is greater than or equal to a preset rotational speed.

9. The method according to claim 7, further comprising the steps of:
   determining a fuel injection amount from an amount of air introduced into a cylinder of the internal combustion engine; and
   adjusting the fuel injection amount when the oxygen fill level exceeds the preset fill level and the catalyst temperature exceeds a preset temperature.

10. An internal combustion engine comprising an exhaust turbocharger, a catalytic converter and a variable valve train, configured to:
    determine a valve overlap parameter in an operating mode of the internal combustion engine;
    adjust the valve overlap parameter on the basis of one selected from the group of catalyst state parameters consisting of an oxygen fill level of the catalyst and a total operation time of the catalyst; and
    adjust the valve overlap parameter to the valve train.

* * * * *